Patented Feb. 12, 1952

2,585,546

UNITED STATES PATENT OFFICE 2,585,546

PRODUCTION OF HIGH VISCOSITY HYALURONIC ACID

Zareh Hadidian, Worcester, Mass., and Norman W. Pirie, Harpenden, England, assignors to G. D. Searle & Co., Skokie, Ill., a corporation of Illinois No Drawing. Application February 3, 1948, Serial No. 6,015

7 Claims. (Cl. 260—210)

This invention relates to hyaluronic acid of high viscosity and processes for the preparation thereof. It further relates to processes for preparing high viscosity hyaluronic acid by fractionation, whereby hyaluronic acid of low viscosity is separated from hyaluronic acid of high viscosity.

Hyaluronic acid is a mucopolysaccharide which constitutes part of the connective tissue of cells of animals and humans. It is composed for the most part of glucuronic acid and acetylglucosamine. A specific enzyme, hyaluronidase, exists in certain bacteria, venoms, spermatazoa, and other sources, and may play a role in the processes of invasion of cells and tissues by depolymerization of hyaluronic acid, the ground substance of connective tissue. A number of substances with varying properties, all called hyaluronic acid, have been isolated by different methods from umbilical cord, skin, vitreous humor, synovial fluid, tumors and haemolytic streptococci.

All prior methods of obtaining hyaluronic acid have yielded preparations of low to medium viscosity. By these procedures the hyaluronic acid preparations produced have had relative viscosities at concentrations of 1 gram per liter in the range of 1.1 to 4.3. These conventional methods have involved precipitation with several volumes of alcohol or acetone, and are inconvenient because of the bulk of liquid. For example, 100 g. of dry, washed cords will give 6 liters of extracts which will result in 30 liters of liquid when precipitated.

We have discovered methods of producing hyaluronic acid which consistently yield fractions of hyaluronic acid preparations having relative viscosities of 8 or greater. Our methods comprise extracting acetone-washed umbilical cords with dilute salt solution, acidifying the resulting extract, removing the clot so formed, precipitating some hyaluronic acid with considerable protein from the acidified extract with ammonium sulfate, agitating the liquor with pyridine thus precipitating another fraction highly contaminated with protein, followed by more ammonium sulfate which forces some pyridine out of solution along with the high viscosity hyaluronic acid. The latter collects at the interface between the two liquid phases and may be separated by filtration, centrifugation or other usual procedure. A modification of this process involves the fractionation of the acidic salt extract from cords with alcohol and ammonium sulfate. Alcohol is added to the acidic salt extract, and the resulting precipitate is removed. Solid ammonium sulfate is added to the liquid until saturation and the solution forms two phases, with a precipitate of hyaluronic acid at the interface.

The modified process involves large volumes of fluid and therefor is somewhat less advantageous than the first procedure described hereinabove. For certain sources of hyaluronic acid, however, it is the prefered method.

As starting material for our process, we use umbilical cords from humans, cattle, pigs and other animals. Our viscous preparations contain 9–11% of acetyl, 2.8–4.3% of nitrogen (by Kjeldahl determination), 0.05% or less of phosphorus, 0–1% of sulfur (generally 0.5–1%) and 34–38% of glucosamine. Analyses are done on samples the dried weight of which was determined by drying at 100° C. in vacuum over sulfuric acid. In some instances the values of acetyl, nitrogen and glucosamine are sometimes lower in our analyses, which may be due to the moisture content of our samples.

Relative viscosity as used herein means the ratio of flow time of a given concentration of hyaluronic acid in a salt solution to that of the salt solution alone. The value of the relative viscosity at a standard concentration of 1 gram per liter is derived from the relation $$V = 1 + \frac{V' - 1}{C}$$

wherein $V$ is the relative viscosity at a concentration of 1 gram per liter, $V'$ is the relative viscosity at a given concentration and $C$ is the given concentration expressed in grams per liter. Viscosity measurements are made in Ostwald viscosimeters with capillaries 9 cm. long and having flow times of about 30 seconds for 4 ml. of water. This volume is used in all the measurements, which are made at 25° C. The standard ionic environment is 0.05 molar salt and 0.05 molar phosphate buffer at pH 7.0.

The hyaluronic acid preparations obtained by precipitation with pyridine as in Example 1 are highly viscous. Solutions containing 0.3 g. per liter have, before removal of residual protein by shaking with chloroform and amyl alcohol, relative viscosities in salt of 2.2 to 2.5. After protein is removed, the relative viscosities are in the range of 1.7 to 2.0 for 0.3 g./liter. The relationship between viscosity and concentration is non-linear. With viscous preparations of hyaluronic acid, an increase in the concentration from 0.3 to 0.6 g./liter increases the viscosity increment 3–4 fold. Solutions containing 1 g./liter have relative viscosities of more than 8.

Example 1

Human umbilical cords are washed carefully and then preserved in acetone. After lying for 1–6 weeks in acetone they are cut up into pieces not more than 1 centimeter long and extracted for a few more days with fresh acetone. The acetone is then drained off as completely as possible and the cords are extracted with successive lots of water, using about four times the cords' wet weight of water for each extraction and leaving each one for at least 2 hours. The first two extracts contain little but acetone and may be thrown away, but following extracts bring out some hyaluronic acid accompanied by much protein. These extracts therefore give a mucin clot on acidification; they are combined and extraction is continued until the amount of clot is small. Five to eight extractions may be necessary. The combined extracts are taken to pH 3 and the clot collected so that it can be worked up for hyaluronic acid along with other fractions grossly contaminated with protein.

The residue is passed through a power driven meat grinder with ⅛" holes in the plate. The round material is suspended in three volumes of approximately 0.1 M NaCl (to reduce the viscosity), and after some hours it is poured into a cloth and the fluid is expressed by hand.

The extraction is repeated twice, each time allowing the new NaCl solution to lie in contact with the cord for at least 12 hours. This work is carried out in a cold room or the fluids should be kept saturated with chloroform at all times.

For each liter of the combined extracts 20 ml. of 5N HCl is added with thorough stirring. If the initial washing of the cords was adequate there will be only a small precipitate. This is stirred gently and intermittently during some hours until it coalesces into a string, which is removed and added to the mucin clot fraction.

Hyaluronic acid can be precipitated from this fluid in several different ways. Precipitation with several volumes of alcohol or acetone is inconvenient because of the bulk of the fluid involved. Two alternative precipitation procedures, disclosed hereinbelow, are preferred.

300 grams of ammonium sulfate are added to each liter of the clear acid fluid. Purified hyaluronic acid is not precipitated by ammonium sulfate but the residual protein in the solution precipitates and brings out some hyaluronic acid with it. The precipitate that separates entangles air forced out of the solution by the salt; this is convenient for it is easier to allow the mixture to stand till all the solid has collected at the top, siphon off the subnatant fluid, and compact the solid scum by centrifuging, than to deaerate and centrifuge down the precipitate. To each litre of fluid 50 ml. of pyridine are added and the mixture is agitated or shaken vigorously; some of the pyridine remains undissolved in the ammonium sulfate solution and a little solid separates at the interface. The mixture is allowed to settle, the clear fluid is siphoned off and the interfacial material is compacted by centrifuging. This centrifuging should be done in a closed apparatus so that the pyridine does not evaporate because the pellicle remains insoluble only if some pyridine phase is present. The pellicle generally contains little hyaluronic acid. A further 250 g. per liter of ammonium sulfate are now added. This forces more pyridine out of solution and it brings with it hyaluronic acid which stays on the interface between the two liquids. On centrifuging in closed vessels, it becomes a compact coherent sheet that can be lifted out of the centrifuge tube with a pair of forceps. The purified hyaluronic acid thus isolated has a relatively viscosity of 8.2 at a concentration of 1.0 g./liter at 25° C. in 0.05 M NaCl and 0.5 M phosphate buffer at pH 7.

Approximately equal amounts of hyaluronic acid are present in the original ammonium sulfate precipitate and in the second pyridine pellicle, but the former may contain as much as 20% of protein and the latter only 5% judging from the nitrogen content. In each case the protein can be removed by shaking with chloroform and amyl alcohol.

Example 2

A comparable method for separating hyalulonic acid from the acid cord extract involves precipitation with acid alcohol in the presence of ammonium sulfate. One and a third volumes of alcohol are added to the acid fluid obtained as in Example 1; a fine gelatinous precipitate separates and this is entangled with air bubbles. The whole precipitate may be sufficiently coherent to float up in an hour, thus enabling one to siphon away most of the fluid. If it fails to do this the air is removed from the precipitate by exposure to vacuum for a few minutes. The precipitate will now sink and can be centrifuged down. This precipitate is suspended evenly in water and re-precipitated by addition of 1.33 volumes of alcohol; on dialysis it goes into solution slowly as the alcohol is removed.

Solid ammonium sulfate is added to the alcoholic supernatant fluid with vigorous mechanical stirring. It dissolves slowly and about 200 g. are needed to saturate each liter. On standing, the system separates into two layers; the lower contains much ammonium sulfate and little alcohol and the upper little ammonium sulfate and much alcohol. As a rule a precipitate which is relatively uncontaminated hyaluronic acid collects on the interface. When separation has proceeded so far that both liquid layers are clear, as much of each as possible is siphoned off and the interfacial material collected by packing it into a coherent felt by centrifuging. It packs very tightly when centrifuged and should be diluted with water before dialysis for otherwise a rigid jelly will be formed that dialyzes very slowly. The proportion in which these two fractions appear varies from preparation to preparation; there is always an alcohol precipitate but sometimes little or no material separates on the addition of ammonium sulfate.

Residual protein is removed from these fractions, as from the pyridine fractions, by shaking with chloroform and amyl alcohol. For effective removal of protein from these viscous solutions the concentration must be kept low. Solutions of crude hyaluronic acid containing less than 2 g. per liter at pH 4 in the presence of 0.1 to 0.5 M salt are shaken briskly with a mixture of one part chloroform to two of amyl alcohol and then centrifuged. The aqueous solution is shaken again, this time mechanically, with fresh solvent. As a rule little or no emulsion is made on this second shaking. After acidification with HCl the fluid can be either dialyzed directly or precipitated with 1.3 volumes of alcohol and then dialyzed in a smaller volume of water. In the latter case precipitation will be incomplete but this is an advantage because the unprecipitated material has a lower viscosity than that precipitated. The unprecipitated hyaluronic acid can be recovered as an interfacial precipitate by adding ammonium sulfate. The yield of purified material, by either of the two methods (of Examples 1 and 2), is 1–2% of the dry weight of the cords. The products of either method have substantially the same properties.

*Example 3*

The cord residue and the mucin clots that have been precipitated by adding acid to the extracts contain more hyaluronic acid, and this can be recovered, in a less viscous form, by digestion with proteolytic enzymes. The cord residue of the consistency at which little more can be squeezed out of it by hand is suspended evenly in about five volumes of 0.01 N HCl containing 0.5 g./l. pepsin. The pH is readjusted to 2 if it is significantly higher than this and the mixture is incubated with toluene for 24 hours at 35–40° C., preferably at about 37° C. The greater part goes into solution, leaving a pink solution and a floating curd. These are easily separated by filtration on a coarse paper at room temperature. There is sufficient gelatin liberated into the fluid to cause gelatinization if it is cooled. This pepsin extract gives an alcohol precipitate and an interfacial precipitate in much the same way as the extract from the minced cords but each has a high nitrogen content. It is preferable therefore to neutralize the pepsin extract and digest it with trypsin to destroy the protein that it contains. The cord residue is also digested with trypsin and the two extracts are combined. These digestions are carried out at 35–40° C., preferably at about 37° C. in the presence of toluene with 2 g./l. commercial trypsin for 24 hours at pH 7.6. When these trypsin-digested fluids are put through the acid: alcohol: ammonium sulfate fractionation, nothing precipitates with the concentrated HCl and very little interfacial material separates. What there is, therefore, is added to the alcohol precipitate and this precipitate is dissolved, reprecipitated, and dialyzed.

The mucin clot can be partially fractionated by precipitation with alcoholic potassium acetate in alkaline solution, but it is generally more satisfactory to incubate it with trypsin and then work up the hyaluronic acid by alcohol precipitation in the manner just outlined for the pepsin extract of the cord residue. The yields of these two products are variable but that from the pepsin extract may be as high as 4%, and that from the mucin clots 1% of the dry weight of the cords. Material from the pepsin extract has only about half the viscosity increment of the viscous fractions and that from the mucin clots is even less viscous. Slightly more viscous products can be made from these by precipitating a series of fractions with alcohol or alcoholic potassium acetate.

We claim:

1. The process of producing high viscosity hyaluronic acid which comprises extracting acetone-washed umbilical cords with salt solution, acidifying the resultant extract, removing the clot so formed, adding ammonium sulfate to the liquid, removing the protein-containing precipitate, adding pyridine, removing the additional protein precipitate, then adding ammonium sulfate until saturation, and collecting the precipitated hyaluronic acid.

2. The process of producing high viscosity hyaluronic acid which comprises extracting acetone-washed umbilical cords with salt solution, acidifying the resulting extract, removing the clot so formed, adding ammonium sulfate to the liquid, removing the protein precipitate, agitating the resulting solution with pyridine and ammonium sulfate, and collecting the hyaluronic acid which is precipitated.

3. The process of producing high viscosity hyaluronic acid which comprises extracting acetone-washed umbilical cords with salt solution, acidifying the resulting extract, removing the clot so formed, adding alcohol, removing the resulting precipitate, adding ammonium sulfate until saturation, and collecting the hyaluronic acid which is precipitated.

4. The process of producing high viscosity hyaluronic acid which comprises extracting acetone-washed umbilical cords with salt solution, acidifying the resulting extract, removing the clot so formed, precipitating protein with an inert protein-precipitant, removing the precipitate, and precipitating hyaluronic acid with a precipitant of the group consisting of (a) pyridine and ammonium sulfate and (b) ammonium sulfate.

5. In a process of producing high viscosity hyaluronic acid, the step which comprises precipitating hyaluronic acid from relatively protein-free aqueous solution by the addition of pyridine and ammonium sulfate.

6. In a process of producing high viscosity hyaluronic acid, the step which comprises precipitating hyaluronic acid from a relatively protein-free aqueous alcoholic solution by saturation with ammonium sulfate.

7. The process of producing high viscosity hyaluronic acid which comprises extracting acetone-washed umbilical cords with a salt solution, acidifying the resultant extract, removing the clot so formed, adding alcohol to the liquid, removing the protein-containing precipitate, adding ammonium sulfate, and collecting the hyaluronic acid thus precipitated.

ZAREH HADIDIAN.
NORMAN W. PIRIE.

REFERENCES CITED

The following references are of record in the file of this patent:

UNITED STATES PATENTS

| Number | Name | Date |
|---|---|---|
| 2,174,475 | Ostern | Sept. 26, 1939 |
| 2,206,622 | Weizmann | July 2, 1940 |
| 2,369,111 | Parfentjev | Feb. 6, 1945 |

OTHER REFERENCES

Chemical Abstracts, vol. 31, (1937), page 143 (2)—Citing: Meyer et al., "Amer. J. Ophthalmology," vol. 19, (1936), pages 859–865.